United States Patent [19]

Kumm

[11] Patent Number: 4,591,351
[45] Date of Patent: May 27, 1986

[54] VARIABLE RATIO PULLEYS FOR FLAT BELT TRANSMISSION SYSTEM

[76] Inventor: Emerson L. Kumm, 1035 E. Laguna Dr., Tempe, Ariz. 85282

[21] Appl. No.: 742,322

[22] Filed: Jun. 7, 1985

[51] Int. Cl.⁴ .................. F16H 55/54; F16H 11/02
[52] U.S. Cl. .......................................... 474/49; 474/53
[58] Field of Search .................. 474/49, 47, 52, 53, 474/201, 242, 244, 245, 179, 51

[56] References Cited

U.S. PATENT DOCUMENTS 4,024,772  5/1977  Kumm ........................ 474/53 X
4,295,836 10/1981  Kumm ........................ 474/51

FOREIGN PATENT DOCUMENTS 485468 10/1929  Fed. Rep. of Germany ........ 47/16
801874 12/1950  Fed. Rep. of Germany ........ 474/53
973207  2/1951  France ............................... 10/1

Primary Examiner—Stephen J. Novosad
Assistant Examiner—Thuy M. Bui
Attorney, Agent, or Firm—Victor Myer; Charles E. Cates

[57] ABSTRACT

In a variable radius pulley drive system wherein a flat drive belt engages the central shanks of drive elements supported by the side pulley sheaves and the radial location of the drive elements is determined by the intersection of logarithmic spiral grooves in the pulley disks of the pulley sheaves whereof the stresses on the bearing members of the drive elements can be substantially reduced by disposing the belt element driving line toward or on the center line or axis of the bearing members of the drive elements.

11 Claims, 9 Drawing Figures

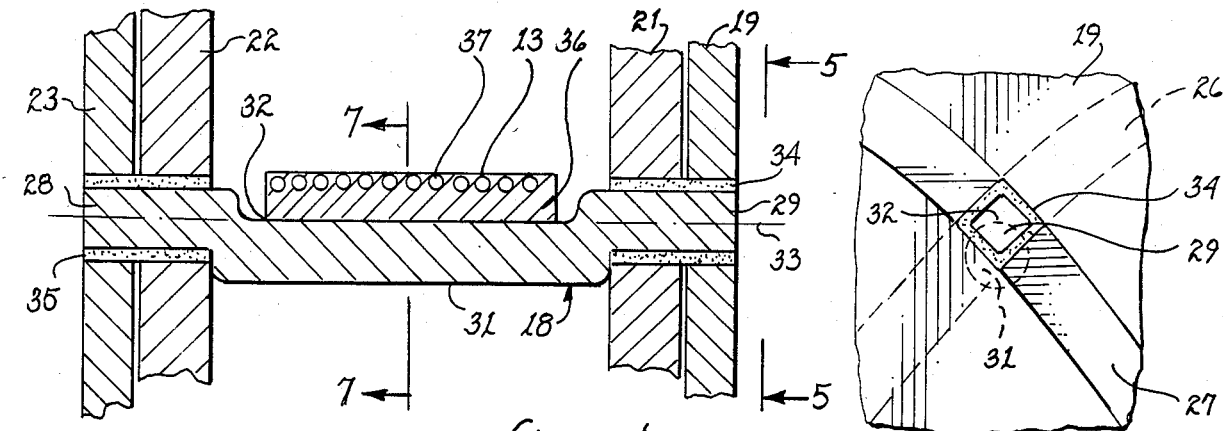
fig. 4
fig. 5
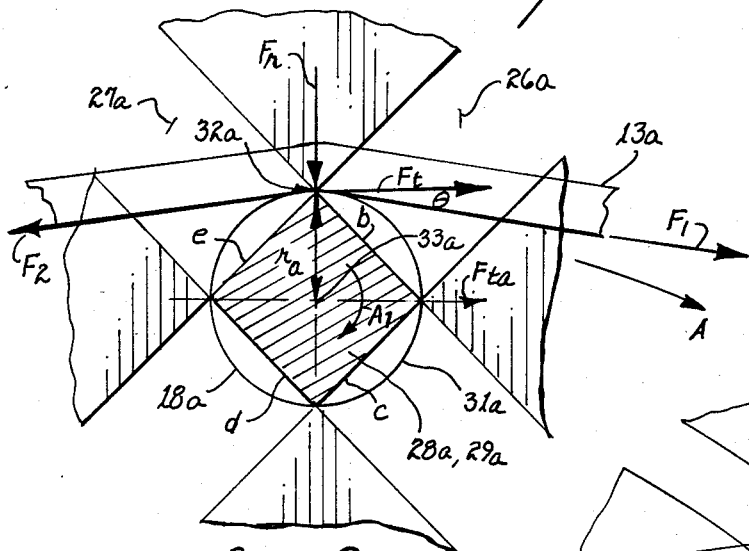
fig. 9
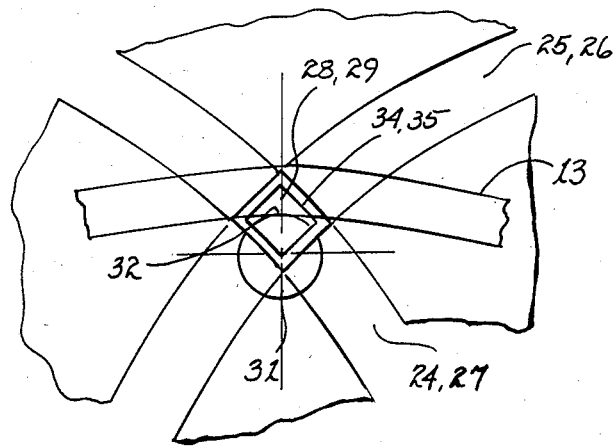
fig. 8
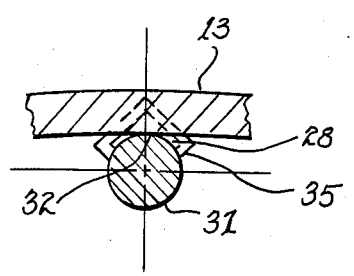
fig. 7

VARIABLE RATIO PULLEYS FOR FLAT BELT TRANSMISSION SYSTEM

BACKGROUND OF THE INVENTION

This invention relates to improvements in variable pulleys for flat belt transmission systems of the nature disclosed in U.S. Pat. No. 4,295,836, Oct. 20, 1981, Emerson L. Kumm.

As shown in the said patent, the variable pulley consists of two pulley sheaves concentric with each other but axially spaced to provide the necessary space for receiving the driving belt. Each pulley sheave is comprised of two pulley disks each of which has logarithmic spiral grooves or approximation thereof extending from near the center of the pulley disk to adjacent its periphery. The logarithmic spiral grooves in the inner and outer disks of each pulley sheave extend in opposite directions so that the grooves of respective inner and outer disks, in effect, intersect with each other.

In the interest of simplicity, throughout this specification, the word -grooves- will be used instead of logarithmic spiral grooves in most instances. It will be understood that -logarithmic spiral- is intended.

The grooves in the inner disks of the two pulley sheaves extend in the same direction and the grooves in the outer ones of the two pulley sheaves extend in an opposite direction. Drive elements which are engaged by the drive belt extend between the pulley sheaves on each side of the pulley and are maintained in their radial positions by the intersections of the grooves. By rotating the two inner disks relative to the two outer disks the radial position of the drive elements is varied, that is, it is increased or decreased depending upon the direction of relative rotation. In this manner the variability of the pulley to change the radius of the drive belt elements is achieved.

The pulleys and belt operate in a dry, unlubricated condition in order to obtain high friction coefficients between the belt and the belt drive elements in the pulleys.

The two ends of each belt drive element located in the intersections of the grooves bear loads to and from the belt and pulley sheaves and are thus subject to substantial wear as are the surfaces of the grooves themselves when sliding movements occur under loaded conditions. The drive elements, of necessity, are not permitted to rotate about their own axes in order to achieve rotation of the pulley under the influence of the drive belt. However, the drive belt exerts a tangential or frictional force on the drive elements in addition to the radial forces existing between the belt and drive elements. The tangential force gives rise to a moment trying to rotate the drive elements. All of these forces contribute to wearing the bearing ends of the drive elements. The tangential force gives rise to a moment trying to rotate the drive elements. All of these forces contribute to wearing the bearing ends of the drive elements located at the intersections of the grooves as well as the disk grooves when the drive elements are changed in radial position.

BRIEF DESCRIPTION OF THE INVENTION

It is an object of the invention to provide an improved variable diameter pulley of the nature described which has substantially reduced wear of the drive element end bearings and of the grooves in the pulley disks which support the drive elements.

It is a further object of the invention to provide an improved drive element for a flat belt variable radius pulley in which the wear factor due to the moment rotating the drive elements is substantially eliminated.

In carrying out the invention according to one form there is provided in a variable diameter pulley belt drive wherein a pair of pulley sheaves support a series of drive elements between them and a drive belt engages a drive surface on such drive elements, a drive element comprising a central shank, a first bearing member at one end of the central shank and a second bearing member at the other end of the central shank, the central shank having a bearing surface against which a drive belt bears, the first bearing member being adapted to be received in one location in one of the pair of pulley sheaves, the second bearing member being adapted to be received in one location of the other of the pair of pulley sheaves, the center line of the first and the second of the bearing members defining a drive radius, the bearing surface of the central shank being disposed to the drive radius.

More specifically according to the invention, the belt drive radius of the drive elements coincides with the center line of the drive element bearings.

In carrying out the invention according to another form there is provided a variable radius pulley belt drive comprising a pair of pulley sheaves, a series of drive elements supported between pairs of sheaves, the drive elements having a drive surface adapted to be engaged by a drive belt, each of the drive elements comprising a central shank including the drive surface, a first bearing member at one end of the central shank and a second bearing member at the other end of the central shank, the first bearing member being adapted to be received in one location in one of the pair of pulley sheaves, the second bearing member being adapted to be received in one location of the other of the pair of pulley sheaves, the center line of the first and the second of the bearing members defining a drive radius, the bearing surface of the central shank being disposed at the drive radius.

More specifically the invention comprises a variable radius pulley belt drive wherein each of the pair of pulley sheaves comprises two relatively movable adjacent disks having the same rotational axis, one disk of each pair including a first series of logarithmic spiral grooves extending in one direction, the other disk of each pair including a second series of logarithmic spiral grooves extending in a second direction and providing intersections of the first series and the second series of grooves, the intersections providing locations for the drive element bearing members.

BRIEF DESCRIPTION OF THE DRAWINGS

Reference should be had to the accompanying drawings in which

FIG. 4 is a fragmentary view in section on an enlarged scale of the structure illustrated in the preceeding figures;

FIG. 5 is a side view taken substantially in the direction of arrows 5—5 of FIG. 4;

FIG. 7 is a sectional view taken substantially in the direction of the arrow 7—7 of FIG. 4;

FIG. 8 is a diagrammatic view on a larger scale illustrating certain components of the invention and their operation; and FIG. 9 is a somewhat diagrammatic view on an enlarged scale useful in explaining the invention.

DESCRIPTION OF THE PREFERRED EMBODIMENT

Figure 1:
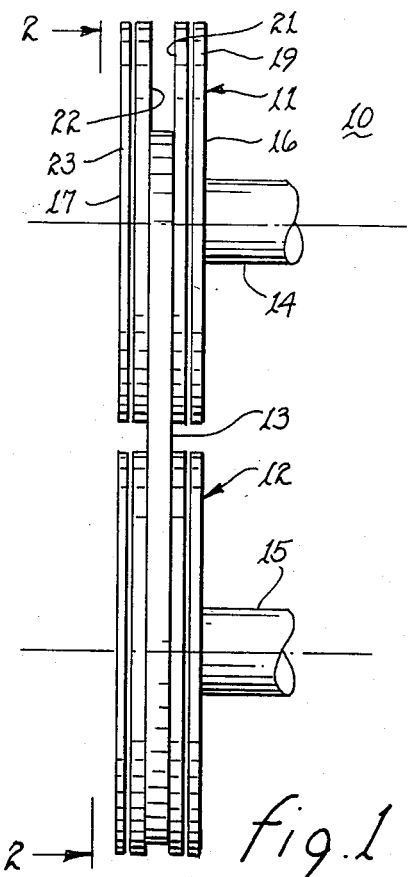
FIG. 1 illustrates an edge on view of a drive and driven pulley system according to the invention.

Referring to the drawings, the invention is shown embodied in a variable diameter pulley drive system 10 comprising variable diameter pulleys 11 and 12 connected by a drive belt 13. The pulley 11 will be considered as the drive pulley and the pulley 12 as the driven pulley throughout this specification but it will be understood that the roles of these pulleys may be reversed without altering the concepts involved. The pulley 11 is appropriately mounted on a shaft 14 and the pulley 12 is similarly appropriately mounted on a shaft 15 as is well understood. The pulleys 11 and 12 are similar to each other and only one of them, namely 11, will be specifically described in this specification. The belt 13 as shown in FIG. 3 corresponds to the position of the belt 13 of FIG. 2 in the dashed line position.

While a two variable radii pulley system is shown, it will be understood that a single variable radius pulley may be utilized along with a fixed pulley and an idler pulley to take up the belt slack.

The pulley 11 comprises a pair of pulley sheaves 16 and 17 between which extend a series of belt drive elements 18, the latter being engaged by the belt 13 for driving, or driven, conditions as will be understood. In one construction of the invention there was a series of twenty-four belt drive elements 18 whereby there would be an angle of fifteen degrees between runs of the belts 13 coming off tangentially from one drive element 18 as compared to that of an immediately adjacent drive element 18.

The pulley sheave 16 comprises a pair of pulley disks 19 and 21 which are parallel to and lie immediately adjacent each other. Similarly the pulley sheave 17 comprises a pair of pulley disks 22 and 23 which are parallel to and lie immediately adjacent to each other. The longitudinal spacing between the pulley sheaves 16 and 17 (pulley disks 21 and 22 axial spacing) remains the same irrespective of the radial adjustment of the belt 13 for different drive or driven speeds. This spacing is such as to adjust as desired to accommodate the width of belt 13 which is selected to carry the load that the system is designed for as is well understood.

Figure 2:
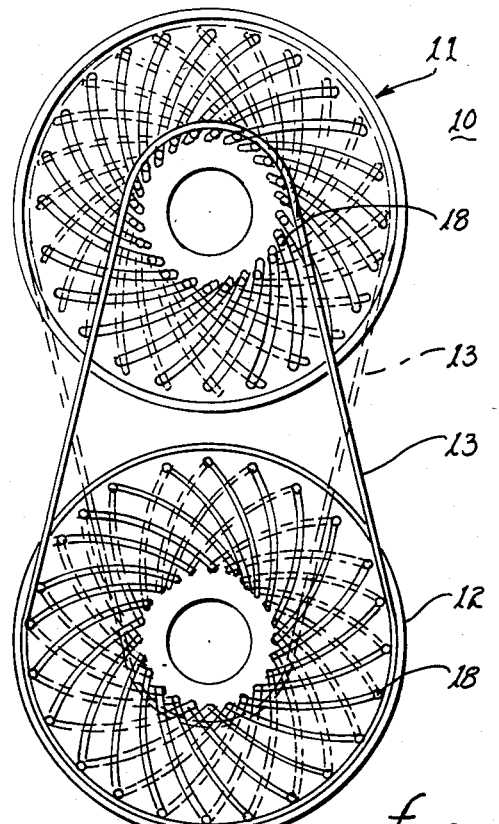
FIG. 2 is a side view of the pulley system illustrated in FIG. 1.
Figure 3:
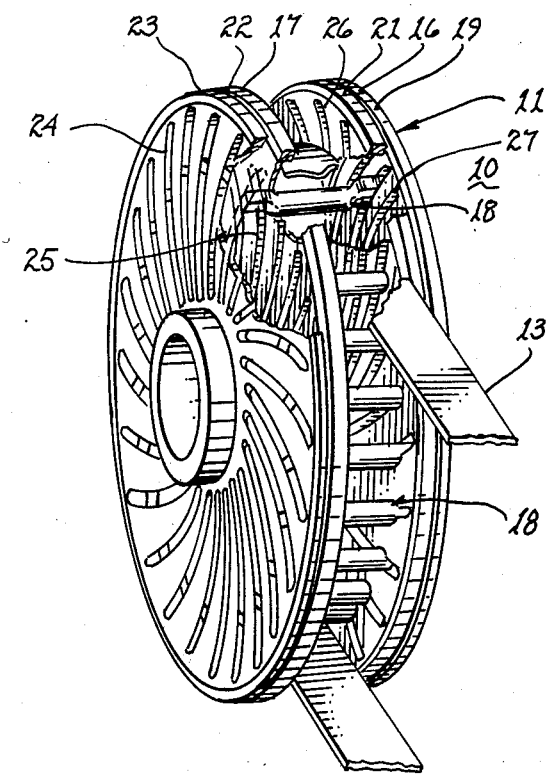
FIG. 3 is a fragmentary perspective view partially broken away of a pulley according to the invention.
Figure 6:
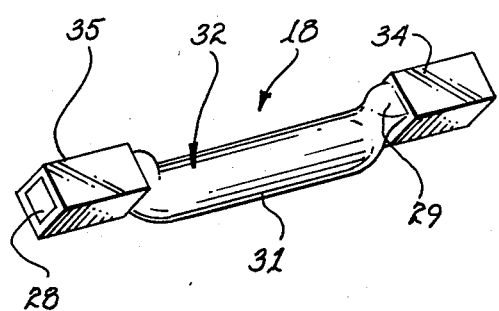
FIG. 6 is a perspective view of a belt drive element according to the invention.

The radial adjustment or position of the belt 13 on the pulley 11 as may be envisioned by the solid line and dashed line positions of belt 13 in FIG. 2 is achieved by altering the radial position of the belt drive elements 18. For example in FIG. 2 the belt drive elements 18 are close to the center of the shaft 14 in the solid line position of belt on pulley 11 and are radially farther out, namely adjacent the periphery, when the belt 13 is in its dashed line position which would be the position shown in FIG. 3.

Variation in the radius of the belt drive elements 18 is achieved by relative rotation of the pulley disks 19 and 21 of pulley sheave 11 and relative rotation of the pulley disks 22 and 23 of pulley sheave 17. Power for such operation, not shown, may be achieved typically as disclosed in U.S. Pat. No. 4,295,836.

The pulley disk 23 has a series of logarithmic spiral grooves 24 therein which progress outwardly from adjacent the center at an angle of forty-five degrees with respect to the radius similar to the showing of the said patent. Similarly the pulley disk 22 has a series of logarithmic spiral grooves 25 radiating outwardly at an angle of forty-five degrees but in the opposite sense to the grooves 24 of pulley disk 23. Since the grooves 24 and 25 radiate outwardly at angles of forty-five degrees but in opposite senses, the intersection of these grooves exists at ninety degrees at all radial positions. This results in a constant geometry at the intersection of the logarithmic spiral grooves 24 and 25 at all radial positions for the ends of the belt drive elements. The pulley disk 21 has a series of logarithmic spiral grooves 26 radiating outwardly identical to the grooves 25 of pulley disk 22. Similarly, the pulley disk 19 includes logarithmic spiral grooves 27 extending outwardly identical to the grooves 24 of pulley disk 23. Hence, the grooves 26 and 27 intersect at ninety degrees at all radial positions to give a constant intersection geometry identical to the logarithmic spiral grooves 24 and 25.

While forty-five degree spirals have been shown and give ninety degree intersections, it will be understood that logarithmic spirals of other angularities may be used as desired. Also, minor variations from a particular angularity may be tolerated so long as the bearing ends supported at the groove intersections will move appropriately when the sheaves are rotated relative to each other.

By appropriate mechanism not illustrated in the subject application but as disclosed in U.S. Pat. No. 4,295,836, the pulley disks 19 and 23 are rigidly connected together and are moved rotationally relative to the pulley disks 21 and 22 which are rigidly connected together thereby causing the intersections of the grooves in these respective disks to move radially and consequently move the belt drive elements 18 radially inwardly or outwardly depending upon their relative direction of the rotation.

It will be clear that the belt 13 as it passes around the pulley 11, or 12, engages the central portion of the belt drive elements 18 and causes one pulley to drive and the other pulley to be driven as is well understood.

The foregoing description of the drive system, the pulleys 11 and 12, the belt 13, and the belt drive elements 18 (as a general element) is set forth in greater detail in the applicant's patent No. 4,295,836, Oct. 20, 1981, previously referred to in this application and does not form a specific part of the invention described in this application but forms the environment in which the invention functions.

The invention in the subject application is concerned with the construction, shape, etc. of the belt drive elements 18 in order to significantly reduce local bearing forces and the subsequent rate of wear of the belt drive element bearings within the intersections of the grooves. Accordingly, the critical belt drive elements 18 will operate much longer without becoming loose due to wear permitting the whole drive system to operate significantly longer between replacements of the belt drive elements 18. Down time for servicing and related costs are very substantially reduced.

Referring more specifically to FIGS. 6-9 inclusive the belt drive elements 18 are shown as comprising two bearing members 28 and 29 at the ends thereof with a central shank 31 therebetween, the bearing members 28 and 29 being received in the intersections of the grooves referred to and the central shank 31 being engaged by the belt 13 as has been described.

Referring to FIG. 4 it may be seen that the inward surface of belt 13 engages the surface of the central shank 31 along a surface or line 32 which may be referred to as the belt drive surface or line. The central shank 31 is depressed, or lowered, relative to the center line 33 of the bearing members 28 and 29 so that the belt drive surface or line 32 is substantially on or coincident with the center line 33. See also FIG. 6 wherein the construction is shown in perspective. The central shank 31, as shown, is circular in cross section while the end bearing members 28 and 29 are square so as to be accommodated in the square or ninety degree intersections of the grooves.

The belt 13 may be of any conventional construction and as illustrated by way of example could include a synthetic rubber portion 36 in which are embedded suitable reinforcing cords 37.

In usage, the central shank 31 may be curved or crowned along its length to center the flat belt between the side walls of pulley discs 21 and 22 in a well-known fashion. Also, in usage, the central shank 31 may use a larger radius of curvature at the surface 32 and different cross section giving a wider belt 13 to shank 31 surface contact 32 that reduces the local rubber 36 compression stress and increases the local cord 27 radius of curvature.

Other cross-sections may be used for particular circumstances so long as the surface on which the belt bears is substantially at or on the bearing center line 33.

Surrounding the square bearings 28 and 29 of the belt drive element 18 may be a pair of relatively tough plastic, or other bearing material, sleeves 34 and 35 which provide acoustical and vibration dampening of the belt drive elements 18 and minimize the unlubricated wear due to sliding of said belt drive elements 18 in the logarithmic spiral grooves. The use of sleeves 34 and 35 depends upon the conditions of particular operations.

FIG. 5 is an end view including a belt drive element 18 according to the invention. Thus the groove 27 is shown in pulley disk 19 while the groove 26 is shown in dashed lines and exists in the pulley disk 21. The grooves 26 and 27 intersect at right angles and the intersection contains the square bearing end 29 and the surrounding bushing 34. The central shank 31 is shown dashed, i.e., behind the pulley disks 19 and 21 but displaced downwardly so that the belt drive surface or line coincides with the center line of the bearing member 29.

The cross sectional view of FIG. 7 shows the central shank 31 and the belt 13 in contact with each other, the shank 31 being below the center line of the bearing member 28 so that the bearing center line coincides with the belt contacting surface of the central shank 31.

FIG. 8 is a diagrammatic and stylized figure on a somewhat larger scale showing the intersecting grooves 26 and 27 which are associated with the pulley disks 21 and 19 (pulley sheave 16). Grooves 26 and 27 in FIGS. 8 and 9 also correspond respectively to grooves 25 and 24 of the pulley disks 22 and 23 (pulley sheave 17). It is noted here that the central shank 31 is displaced downwardly relative to the center line of the bearing members 28 and 29.

The reference characters utilized in FIG. 9 will include the subscript "a" which will indicate the identity of parts having the same reference characters without the "a".

In FIG. 9 there is shown a diagrammatic and stylized view on a larger scale, similar to FIG. 8 but differing therefrom in that the bearing members 28a, 29a are on the same center line as the central shank 31a represented by the circle with this reference character on it. In other words the central shank 31a of a bearing belt drive member has its end squared off so that the bearing members are a square inscribed in the circle 31a of the central shank. This is the previous design of a drive element and was that utilized in the form of the invention illustrated in Pat. No. 4,295,836.

An analysis of the forces and a description thereof as applied to FIG. 9 (the prior art of the applicant) will illustrate the understanding of the invention described in this application.

For simplicity in description, it will be understood that the view of FIG. 9 is in effect a view in the direction of arrows 5—5 of FIG. 4 in that instance wherein the central shank has the same center line as the center line of the bearings. The slot or groove 27a exists in the pulley disk 19 and the intersecting slot or groove 26a exists in the pulley disk 21.

Thus the intersection of grooves 27a and 26a forms a square "retainer" which hold the bearing 29a as shown by the cross hatched square in FIG. 9. The center 33a, or axis, of the bearing 29a coincides with the axis of the central shank 31a. The belt 13a then engages the central shank 31a along the drive line 32a and it will be seen in this example that the drive line 32a is displaced from the axis 33a by a distance equal to the radius $r_a$ of the central shank 31a or one-half of the diagonal of the square bearing 29a (28a). The sides of the square cross section of the bearing 29a may, of course, be made larger or smaller than the inscribed square if desired. The sides of the square representing the bearing 29a have been labeled b,c,d,e for exactness in identifying the location of the various components of the forces involved still to be described.

As shown the belt 13a has an angle between its input side and its output side which is determined by the number of drive elements in the pulleys that has been already indicated. Upon the assumption that there are a total of twenty-four drive elements 18a in each pulley the angle $\theta$ is equal to one-half of fifteen degrees, i.e., seven and one-half degrees. It is assumed that the pulley of FIG. 9 is driven in the direction as shown by the arrow A. Thus, the driving force of the belt 13a, i.e., the tension therein, may be represented by the force $F_1$ in any consistent system of units. $F_1$ is taken to be the total driving force realizing that there is tension in the belt on its input side which may be represented by the arrow $F_2$. The net force on the belt drive element due to the forces $F_1$ and $F_2$ results in a tangential component $F_t$ and a radial component $F_r$.

The radial component $F_r$ causes the drive pin bearing 29a to tend to move downwardly thereby putting stress (bearing load) on surfaces c and d. The bearing load of $F_r$ on surface c is taken against the side of groove 26a of pulley disk 21 and the bearing load against side d is taken by the side of groove 27a of pulley disk 19. (This is just considering the bearing end 29a but it will be understood that the similar condition exists at bearing end 28a).

The effect of the tangential force, $F_t$, may be analyzed in a well known fashion by considering it to be a force of equal magnitude and direction, $F_{ta}$, passing through the drive element axis 33a and a moment, $F_t \times r_a$, tending to rotate the drive element 18a about its axis 33a as shown by the arrow $A_1$. The force, $F_{ta}$, causes additional loads to exist on surfaces b and c. The bearing load of $F_{ta}$ on surface b is resisted or taken by the side of groove 27a of pulley disk 19 and the bearing load of $F_{ta}$ on surface c is taken by the side of groove 26a of pulley disk 21.

The moment ($F_t \times r_a$) caused by the tangential component $F_t$ gives additional bearing loads which increase the local stresses in a well known fashion toward the edges of the square bearing end 29a, 28a, of the drive element 31a.

The rotational force due to the moment $F_t \times r_a$ may be exerted on all sides b, c, d, and e dependent on the magnitude of the other forces. The moment on side c is resisted by the lower side of groove 26a, that on side d is resisted by the lower side of groove 27a of pulley disk 19, the moment on side e is resisted by the upper side of groove 26a in pulley disk 21 and the moment on side b is resisted by the upper side of groove 27a of pulley disk 19. It will be observed that the side c has forces on it from the radial component $F_r$, the component $F_{ta}$, and the moment component caused by the tangential component $F_t$. Hence, in this situation as involved in the structures of the applicant's patent the side c has the maximum stress exerted thereon. The largest factor in the local surface stress is due to the moment caused by the tangential force $F_t$ which is to say $F_t$ multiplied by the length, $r_a$.

Radial movement of the drive element 31 in the logarithmic spiral grooves while simultaneously transferring torque can then result in wear of the plastic sleeves 34a, 25a particularly along sleeves outer edges where the greatest surface stress magnitude exists.

The invention is concerned with the elimination of the stresses caused by the moment of the tangential force $F_t$, it being noted that this moment exists because the line of application of the driving force at the drive line 32a, or surface, is displaced from the center line 33a of the bearing supports as well as that of the drive shank by a distance equal to $r_a$.

The moment of the force $F_t$ can be eliminated by having the line or surface 32a of application of the force coincide with the center 33a of the bearings 29a and 28a. This may be understood by considering that the moment is equal to $F_t \times r_a$ and if the radius $r_a$, that is the distance between the application of the force $F_t$ and the center around which rotation takes place, is reduced to zero, then $F_t$ multiplied by zero equals zero. Consequently, the stresses due to the rotating moment are eliminated. This is achieved according to the invention as is shown in the various figures and particularly FIGS. 4–8. In each of these figures it is seen that the line of force application 32 lies on the center line 33 of the bearings 28 and 29. There is no tendency to a rotating moment caused by the line or surface of engagement of the belt with the drive shank 31. Hence the only stresses exerted at the side c are the components due to the radial force $F_r$ and the tangential force $F_t$. The side b has a stress due only to the force $F_t$ and the side d has a stress due only to the force $F_r$. The sides d and e have no stress components due to the force $F_t$ and the sides e and b have no stress components due to the force $F_r$.

Accordingly the stresses tending to cause wear of the bearing members 29 and 28 are very substantially reduced over constructions in which the line of application of the belt drive is displaced from the center line of the drive element rather than having the center line and the drive line being coincident.

While a preferred form of the invention has been shown it will be understood that many other forms may be devised within the scope of the disclosure.

I claim:

1. In a variable diameter pulley belt drive wherein a pair of pulley sheaves support a series of drive elements between them and a drive belt engages a drive surface on such drive elements, a drive element comprising a central shank, a first bearing member at one end of said central shank and a second bearing member at the other end of said central shank, said central shank having a bearing surface against which a drive belt bears, said first bearing member being adapted to be received in one location in one of said pair of pulley sheaves, said second bearing member being adapted to be received in one location of the other of said pair of pulley sheaves, the center line of said first and said second of said bearing members defining a drive line, the bearing surface of said central shank being disposed to said drive line.

2. A drive element member comprising two spaced apart bearing members, and a central drive shank between said bearing members, said drive shank being depressed relative to said bearing members for reducing the rotational moment on said drive element.

3. A drive element according to claim 1 wherein said central shank is depressed relative to said center line.

4. A drive element according to claim 1 wherein said drive line coincides with said center line.

5. A drive element according to claim 4 wherein each of said first and said second bearing members includes a relatively wear resistant surrounding sleeve member.

6. A variable diameter pulley belt drive comprising a pair of pulley sheaves, a series of drive elements supported between said pair of sheaves, said drive elements having a drive surface adapted to be engaged by a drive belt, each of said drive elements comprising a central shank including said drive surface, a first bearing member at one end of said central shank and a second bearing member at the other end of said central shank, said first bearing member being adapted to be received in one location in one of said pair of pulley sheaves, said second bearing member being adapted to be received in one location of the other of said pair of pulley sheaves, the center line of said first and said second of said bearing members defining a drive line, the bearing surface of said central shank being disposed at said drive line.

7. The variable pulley belt drive according to claim 6 wherein each of said first and said second bearing members includes a relatively wear resistant surrounding sleeve member.

8. A variable diameter pulley belt drive according to claim 6 wherein each of said pair of pulley sheaves comprises two relatively movable disks lying alongside each other, one disk of each pair including a first series of logarithmic spiral grooves extending in one direction, the other disk of said each pair including a second series of logarithmic spiral grooves extending in a second direction and providing intersections of said first series and said second series of grooves, said intersections providing locations for said bearing members.

9. The variable diameter pulley belt drive according to claim 8 wherein each of said first and said second bearing members includes a relatively wear resistant surrounding sleeve member.

10. The variable diameter pulley belt drive according to claim 8 wherein said grooves comprise logarithmic exponential spirals intersecting at right angles.

11. The variable diameter pulley belt drive according to claim 10 wherein each of said first and said second bearing members comprises a square cross-section.

* * * * *